W. L. MANN.
POWER TRANSMITTING MECHANISM.
APPLICATION FILED DEC. 16, 1910.
1,009,846.
Patented Nov. 28, 1911.
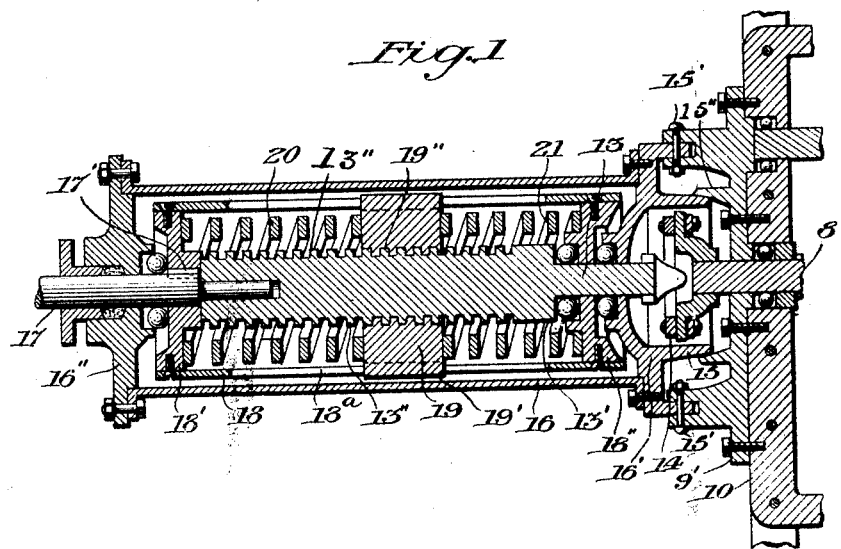
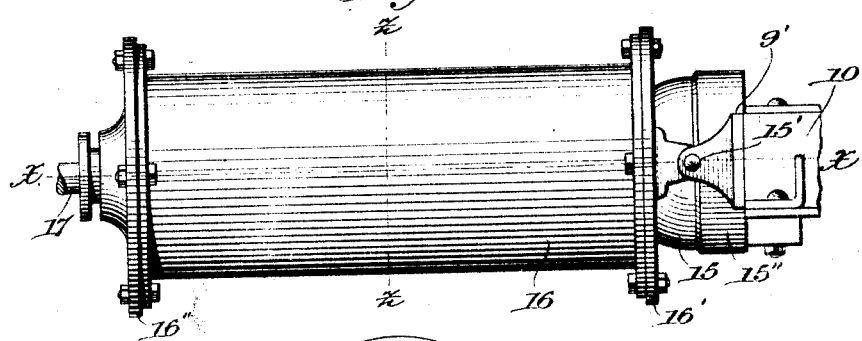
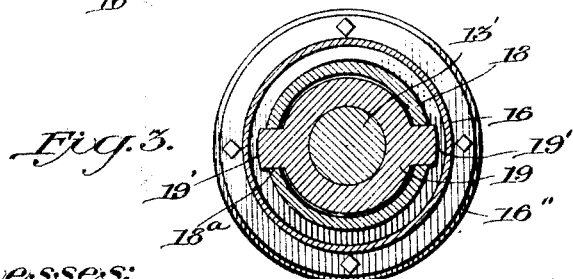
Witnesses:
Frederick E. Howard.
Luke E. Hinton.
Inventor:
William L. Mann
by George W. Hinton
Atty.

UNITED STATES PATENT OFFICE.

WILLIAM L. MANN, OF ST. JOSEPH, MISSOURI.

POWER-TRANSMITTING MECHANISM.

1,009,846.   Specification of Letters Patent.   Patented Nov. 28, 1911.

Application filed December 16, 1910. Serial No. 597,735.

*To all whom it may concern:*

Be it known that I, WILLIAM L. MANN, a citizen of the United States, residing at St. Joseph, in the county of Buchanan and State of Missouri, have invented certain new and useful Improvements in Power-Transmitting Mechanisms, of which the following is a specification, reference being had therein to the accompanying drawing.

My invention relates to improvements in power transmitting mechanisms of the yieldable speed type; the objects of which are first, to provide a simple, substantial and durable mechanism of this class, which is positive in its action and which will transmit power without sudden strain and concussion of the parts involved; thereby obviating slippage of the parts, the use of adhesives and the other disadvantages experienced in the use of friction clutches; second, to so construct the parts of a power transmitting mechanism that they shall be dust proof, and self lubricating throughout.

I attain these objects by the mechanism illustrated in the accompanying drawing, in which:—

Figure 1 is a horizontal section of the mechanism, on the line X X seen in Fig. 2, looking downward. Fig. 2 is a side elevation. Fig. 3 is a transverse section on the line Z Z seen in Fig. 2, looking toward the left.

Referring to Fig. 1, power shaft 8 is rotatably mounted in gear case 10, and is rotated by any source of power, not shown, such as an explosion engine, electric motor and the like. Said shaft and gear case may be of any different forms that are suitable for connection with the herein described mechanism, and are therefore neither fully shown nor described. The outer end of shaft 8 is connected with the following described yieldable power transmitting mechanism. Shaft 8 is connected with worm shaft 13 by universal joint 14, covered by casing 15, hinged to plate 9′ by bolts 15′. Said casing together with socket 15″ (formed with plate 9′) provides a dust proof casing for universal joint 14. Plate 9′ is secured to gear case 10.

With casing 15 is formed the inner head 16′ of worm casing 16, secured thereto and provided with outer head 16″ secured thereon. The inner end portion of vehicle shaft 17 is rotatably mounted in head 16″, while the outer end portion of said shaft is adapted to drive a vehicle in any of the usual well known ways, and since said shaft portion and vehicle form no part of my invention, they are neither shown nor described.

Formed with worm shaft 13 is the worm 13′ having spirally arranged threads 13″ formed thereon. The outer end of said worm is rotatably mounted on the reduced inner end portion of shaft 17. The outer cylinder head 18′ is secured on shaft 17 by key 17′. Said head is secured on the outer end of cylinder 18, provided with inner cylinder head 18″, rotatably mounted on shaft 13. Said cylinder has slots 18ᵃ formed longitudinally through the sides thereof, through which extend the drive bosses 19′, formed on drive block 19. Said drive block has internal threads 19″, adapted to fit threads 13″. Said threads are made at any desired angle of inclination, from that of one ordinary screw thread, to that of a plurality of threads of any desired number arranged in spirals around said worm.

In cylinder 18 and between head 18′ and said drive block, is the spiral anti-concussion spring 20, while between said block and cylinder head 18″ is the reverse movement anti-concussion spring 21. Said springs are adapted to be compressed against their respective cylinder heads by drive block 19, moved against spring 20 by forward rotation of worm 13′ and against spring 21 by reverse, or backward rotation of said worm. Said springs are adapted to elastically resist the movement of block 19.

Having fully described my invention, what I claim as new and original and desire to secure by Letters Patent is:—

1. A dust proof casing; an inner worm casing head; a worm casing adapted to hold oil therein said worm casing having its inner end secured to said inner worm casing head and its outer end provided with an outer worm casing head secured thereon; a worm shaft in said worm casing said worm shaft having one end portion thereof rotatably mounted in said inner worm casing head and extended therefrom into said dust proof casing said extended end portion being adapted to have power applied thereto; a spirally threaded worm formed on the other end portion of said worm shaft; a vehicle shaft having an end portion thereof rotatably mounted in said outer worm casing head and a reduced end portion on which the end of said worm is rotatably mounted; a cylinder in said worm casing said cylinder having a plurality of slots formed longitudinally through the sides thereof said cylinder being provided with an outer cylinder head secured on said vehicle shaft and with an inner cylinder head rotatably mounted on said worm shaft; a drive block on said worm said block being provided with internal threads in engagement with the spiral threads of said worm for moving said block the latter being further provided with drive bosses formed thereon said bosses being slidable in the slots in said cylinder; a spring in said cylinder between said outer cylinder head and said block; another spring in said cylinder between said inner cylinder head and said block and rotating means for rotating said worm shaft.

2. A vehicle shaft having a reduced end portion formed on one end thereof; a spirally threaded worm having one end thereof rotatably mounted on said reduced end portion of said vehicle shaft and a worm shaft formed on the other end portion thereof and extended therefrom; power connecting means on the extended end of said worm shaft for applying power thereto a drive block threaded on said worm; engaging means on said block and said vehicle shaft whereby the same are engaged for rotating the latter; elastic resisting means at each side of said block for resisting movement thereof in either direction; and mounting means wherein said worm shaft and the said one end of said vehicle shaft are rotatably mounted.

In testimony whereof I affix my signature in the presence of two witnesses.

WILLIAM L. MANN.

Witnesses:
 LUKE E. HINTON,
 JOHN J. HINTON.